US010611455B2

(12) United States Patent
Guilloteau

(10) Patent No.: US 10,611,455 B2
(45) Date of Patent: Apr. 7, 2020

(54) AIRCRAFT ASSEMBLY COMPRISING A SELF-STIFFENED PANEL ASSEMBLED WITH A STRUCTURAL ELEMENT BY MEANS OF AN ALTERNATION OF TERMINAL RIBS AND TERMINAL TABS

(71) Applicant: Airbus Operations SAS, Toulouse (FR)

(72) Inventor: Damien Guilloteau, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 314 days.

(21) Appl. No.: 15/827,047

(22) Filed: Nov. 30, 2017

(65) Prior Publication Data
US 2018/0148155 A1 May 31, 2018

(30) Foreign Application Priority Data

Nov. 30, 2016 (FR) ...................................... 16 61683

(51) Int. Cl.
*B64C 1/12* (2006.01)
*B64C 1/06* (2006.01)
*B64C 1/14* (2006.01)
*B64C 1/10* (2006.01)

(52) U.S. Cl.
CPC ................ *B64C 1/12* (2013.01); *B64C 1/061* (2013.01); *B64C 1/069* (2013.01); *B64C 1/10* (2013.01); *B64C 1/1407* (2013.01); *B64C 1/1461* (2013.01)

(58) Field of Classification Search
CPC ........... B64C 1/061; B64C 1/069; B64C 1/12; B64C 1/1407; B64C 1/1461
See application file for complete search history.

(56) References Cited

U.S. PATENT DOCUMENTS

| 2,230,393 | A | * | 2/1941 | Thomson | ................. | B64C 3/00 244/124 |
| 2003/0205011 | A1 | * | 11/2003 | Bequet | ..................... | B64C 1/12 52/272 |
| 2005/0263645 | A1 | * | 12/2005 | Johnson | .............. | B61D 17/041 244/119 |
| 2008/0149769 | A1 | * | 6/2008 | Koch | .................... | B64C 1/062 244/121 |

(Continued)

FOREIGN PATENT DOCUMENTS

WO 2006001859 1/2006

OTHER PUBLICATIONS

French Search Report, dated Jun. 12, 2017, priority document.

*Primary Examiner* — Michael H Wang
(74) *Attorney, Agent, or Firm* — Greer, Burns & Crain, Ltd.

(57) ABSTRACT

In order to allow robust assembly between a structural element and a self-stiffened panel comprising a skin and a stiffening structure formed of a network of ribs extending out from a first face of the skin, the structural element comprises at least one end formed of terminal tabs separated by cut-outs delimited by the terminal tabs and applied to the first face of the skin at an end part of the skin. In addition, the stiffening structure comprises at least one end formed of several terminal ribs extending respectively through the cut-outs. Finally, each of the terminal tabs is fixed to the end part of the skin via through-fixing elements.

12 Claims, 3 Drawing Sheets

(56) References Cited

U.S. PATENT DOCUMENTS

| | | | |
|---|---|---|---|
| 2009/0236473 A1* | 9/2009 | Rawdon | B64C 1/08 244/120 |
| 2009/0294588 A1* | 12/2009 | Griess | B64C 1/068 244/121 |
| 2010/0230544 A1* | 9/2010 | Huber | B64C 1/20 244/131 |
| 2011/0036946 A1* | 2/2011 | Depeige | B64C 1/18 244/120 |
| 2012/0135200 A1* | 5/2012 | Burvill | B64C 1/12 428/174 |
| 2013/0216850 A1* | 8/2013 | Vichniakov | B64C 1/061 428/573 |
| 2015/0034763 A1* | 2/2015 | Marin | B64C 1/061 244/119 |
| 2015/0251775 A1* | 9/2015 | Durnad | B64C 1/061 244/131 |
| 2016/0009366 A1* | 1/2016 | Marks | B64V 1/06 244/123.1 |
| 2017/0152658 A1* | 6/2017 | Schaefer | B64D 11/0023 |

\* cited by examiner

AIRCRAFT ASSEMBLY COMPRISING A SELF-STIFFENED PANEL ASSEMBLED WITH A STRUCTURAL ELEMENT BY MEANS OF AN ALTERNATION OF TERMINAL RIBS AND TERMINAL TABS

CROSS-REFERENCES TO RELATED APPLICATIONS

This application claims the benefit of the French patent application No. 1661683 filed on Nov. 30, 2016, the entire disclosures of which are incorporated herein by way of reference.

TECHNICAL FIELD

The present invention relates to the field of aircraft structures and relates more particularly to the structural connection between a self-stiffened panel and a structural element.

BACKGROUND OF THE INVENTION

In conventional aircraft it is common place to use panels made up of a skin and of stiffeners fixed to the skin in order to give it the necessary stiffness. The skin is, in general, several millimeters thick. As for the stiffeners, these are for example T-section or I-section stiffeners each having a flange (sole) by means of which they are assembled with the skin, generally by riveting.

These stiffeners have a web of a height sufficient to allow the stiffeners to be assembled with one another and with the surrounding structure by means of fishplates fixed to the webs of the stiffeners.

FIG. 1 illustrates one example of such a conventional panel 10, in this instance a panel extending over the windscreen 12 of an airplane and connected to the upper surround 14 of the windscreen and to a circumferential fuselage frame 15. Such a panel is sometimes referred to as a "windscreen visor."

FIG. 1 shows the skin 16 of the panel 10 and stiffeners 18 thereof, which are sometimes referred to as "uprights." These stiffeners are connected to one another, to the surround 14 or to the circumferential frame 15 by means of fishplates.

FIG. 2 thus illustrates the connection between two of the stiffeners 18A and 18B of the panel 10 by means of fishplates 20.

However, recent developments in aircraft construction tend to promote the use of self-stiffened panels, which means to say panels made up of a skin and of a stiffening structure incorporated into the skin. The use of self-stiffened panels in general makes it possible to reduce the number of components and the number of assembly operations, to reduce the number of fixing elements and therefore the mass of the panel, and to improve the stiffness of the panel.

However, the relatively short height of the ribs that make up the stiffening structure of such a panel and the relatively high density of these ribs do not allow the stiffening structure to be assembled with the surrounding structure using fishplates.

SUMMARY OF THE INVENTION

The invention has a particular objective of affording a simple, economical and effective solution to this problem.

To this end it proposes an aircraft assembly comprising a structural element and a self-stiffened panel comprising a skin and a stiffening structure incorporated into the skin and formed of a network of ribs extending out from a first face of the skin.

According to the invention, the structural element comprises at least one end formed of several terminal tabs separated from one another by cut-outs and applied to the first face of the skin of the self-stiffened panel at an end part of the skin.

In addition, the stiffening structure of the self-stiffened panel comprises at least one end formed of several terminal ribs extending respectively through the cut-outs.

Finally, each of the terminal tabs is fixed to the end part of the skin of the self-stiffened panel by means of through-fixing elements.

In general, the alternating positioning of the terminal tabs of the structural element and of the terminal ribs of the stiffening structure allows for a progressive transfer of inertia between the self-stiffened panel and the structural element.

The invention thus allows effective assembly between a self-stiffened panel and an adjacent structural element.

In the particular case of a panel adjacent to the windscreen of an aircraft, the use of a self-stiffened panel, in particular, allows better ability to withstand bird strike or collisions with other projectiles likely to strike the nose of an aircraft.

It should be noted that the layout of the terminal tabs and terminal ribs means that each cut-out thus has a closed end, facing which a free end of the corresponding terminal rib extends.

For preference, the terminal tabs comprise respective stiffening ribs.

In this case, the structural element advantageously comprises a main rib to which the respective stiffening ribs of the terminal tabs are connected.

In addition, each of the respective stiffening ribs of the terminal tabs advantageously has a height which decreases in the direction of a free end of the corresponding terminal tab.

Moreover, each of the terminal ribs preferably has a height which decreases in the direction of the closed end of the corresponding cut-out.

For preference, the stiffening structure of the self-stiffened panel comprises a closure rib to which the terminal ribs are connected.

In this case, each of the terminal ribs is preferably connected to a region of connection to the closure rib of at least one other rib of the stiffening structure, which other rib is arranged on the other side of the closure rib to the terminal rib.

Moreover, in one preferred embodiment of the invention, the fixing elements pass jointly through the terminal tabs and the end part of the skin of the self-stiffened panel.

The fixing elements are, for example, rivets.

As an alternative, the fixing elements may be incorporated into the terminal tabs and pass through the end part of the skin of the self-stiffened panel, or may be incorporated into the end part of the skin of the self-stiffened panel and pass through the terminal tabs.

For preference, the terminal tabs extend in the continuation of a main sole of the structural element in a manner that is offset with respect to a surface of the main sole, such that the end part of the skin has a second face, the opposite face to the first face, extending in the continuation of the surface of the main sole.

In one preferred embodiment of the invention, the structural element is a windscreen surround, and the self-stiffened panel forms a visor or a fuselage deflector, or in which the structural element is a door or window surround, and the self-stiffened panel is a fuselage panel, or in which the structural element is a sealed bulkhead surround, and the self-stiffened panel forms an aircraft fuselage front or rear sealed bulkhead.

BRIEF DESCRIPTION OF THE DRAWINGS

The invention will be better understood, and further details, advantages and features thereof will become apparent from reading the following description given by way of nonlimiting example and with reference to the attached drawings in which.

In all of these figures, identical references may denote elements that are identical or analogous.

DETAILED DESCRIPTION OF THE PREFERRED EMBODIMENTS

Figure 1:
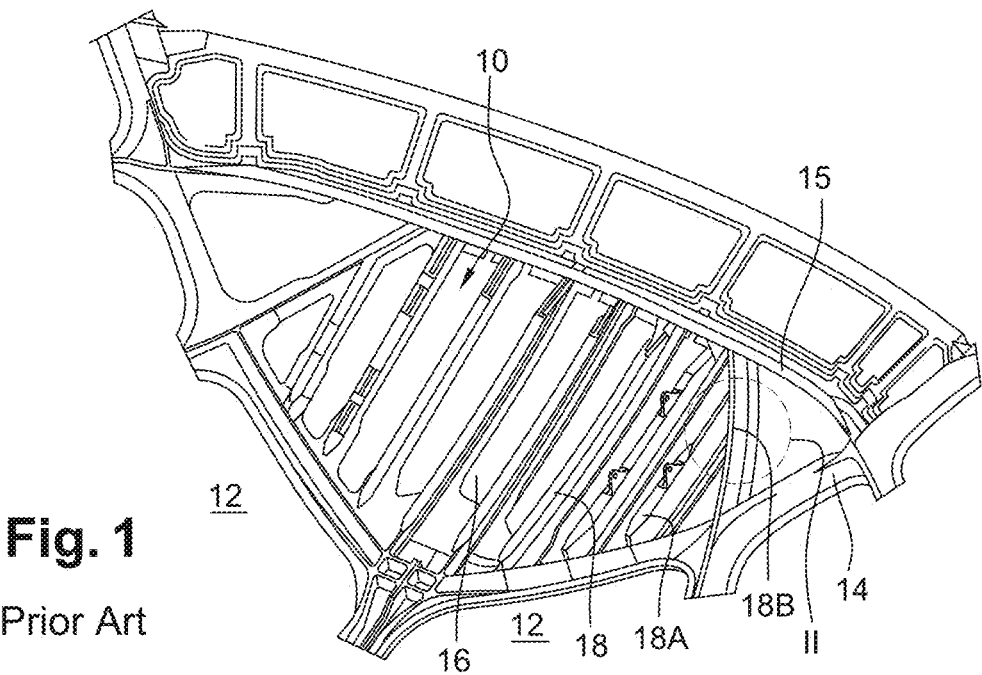
FIG. 1, already described, is a partial schematic view from beneath of an upper part of a conventional aircraft nose, illustrating part of a windscreen surround and a conventional panel provided with stiffeners assembled onto it.
Figure 2:
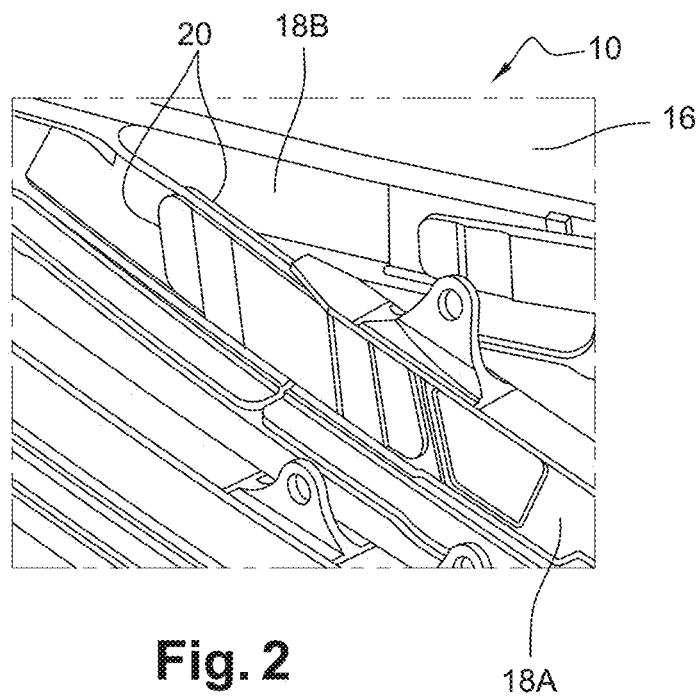
FIG. 2, already described, is a view on a larger scale of detail II of FIG. 1.
Figure 3:
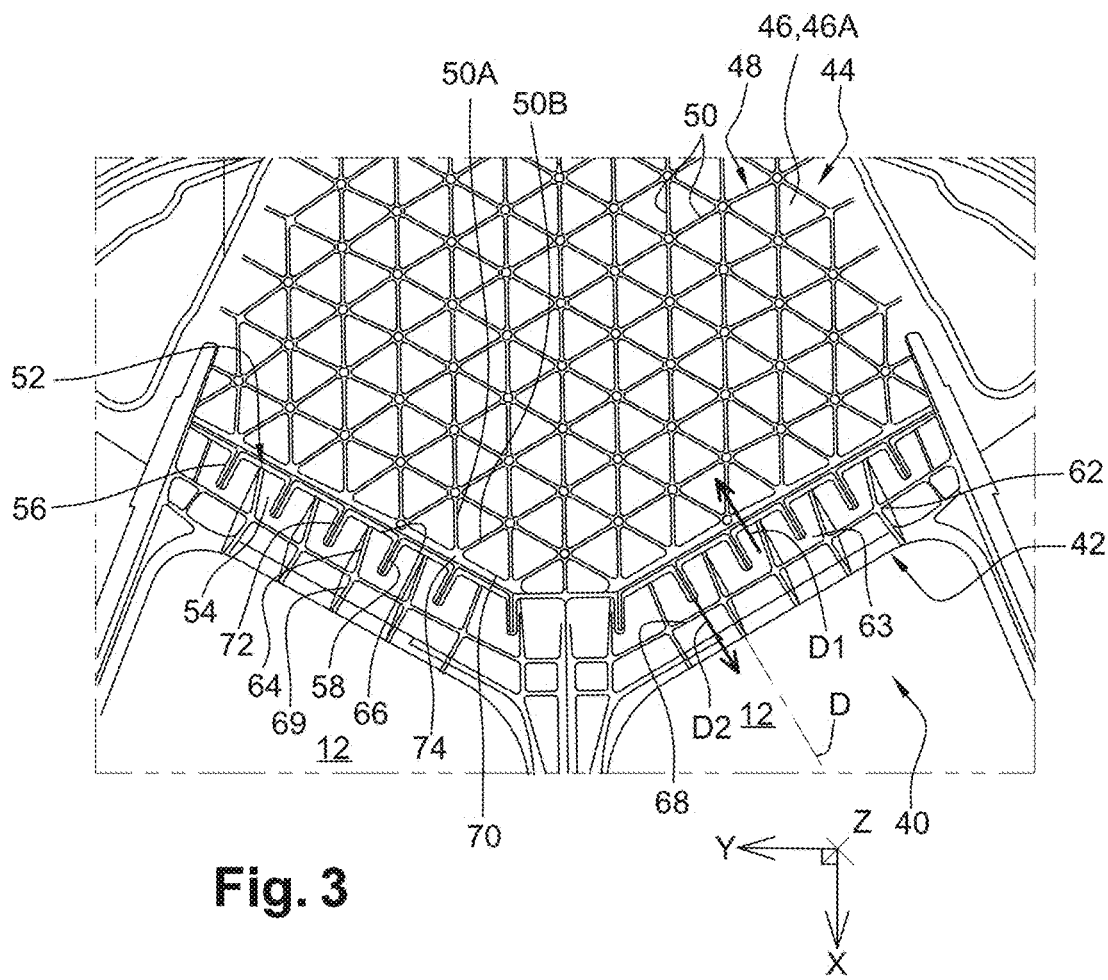
FIGS. 3 to 5 are partial schematic views, respectively from the front, in perspective and in section, of an aircraft assembly according to a preferred embodiment of the invention, comprising a self-stiffened panel and a structural element assembled therewith.
Figure 4:
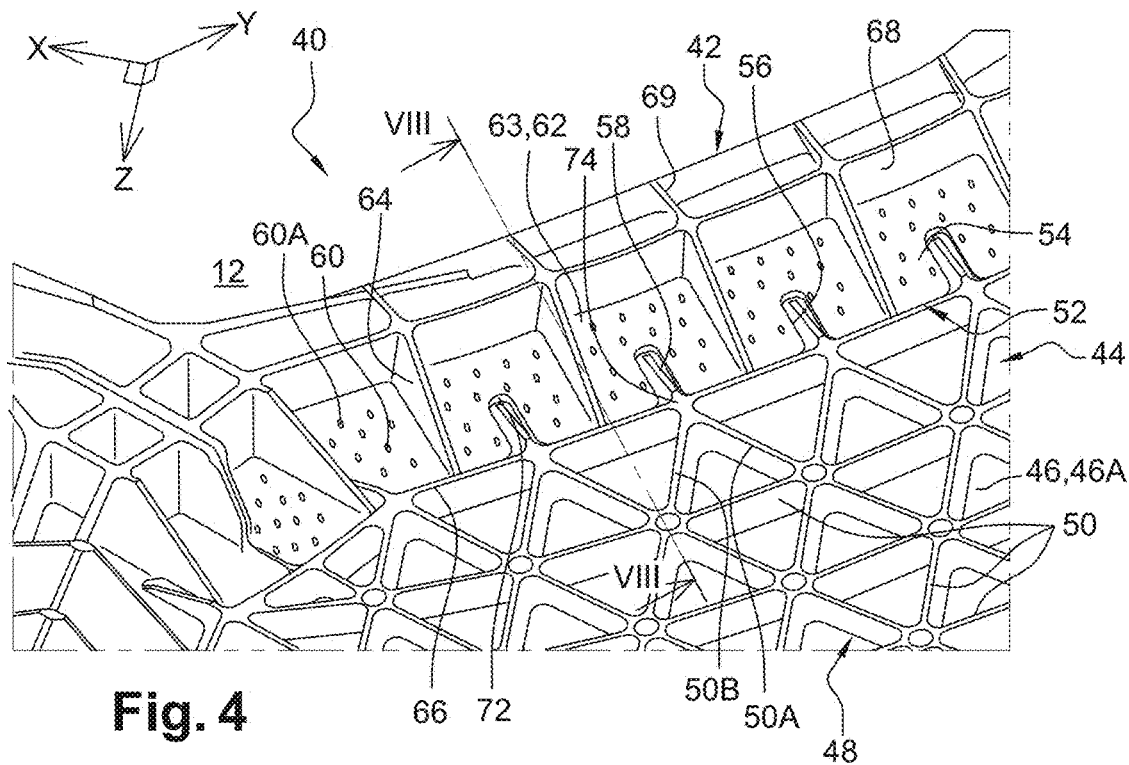
Figure 5:
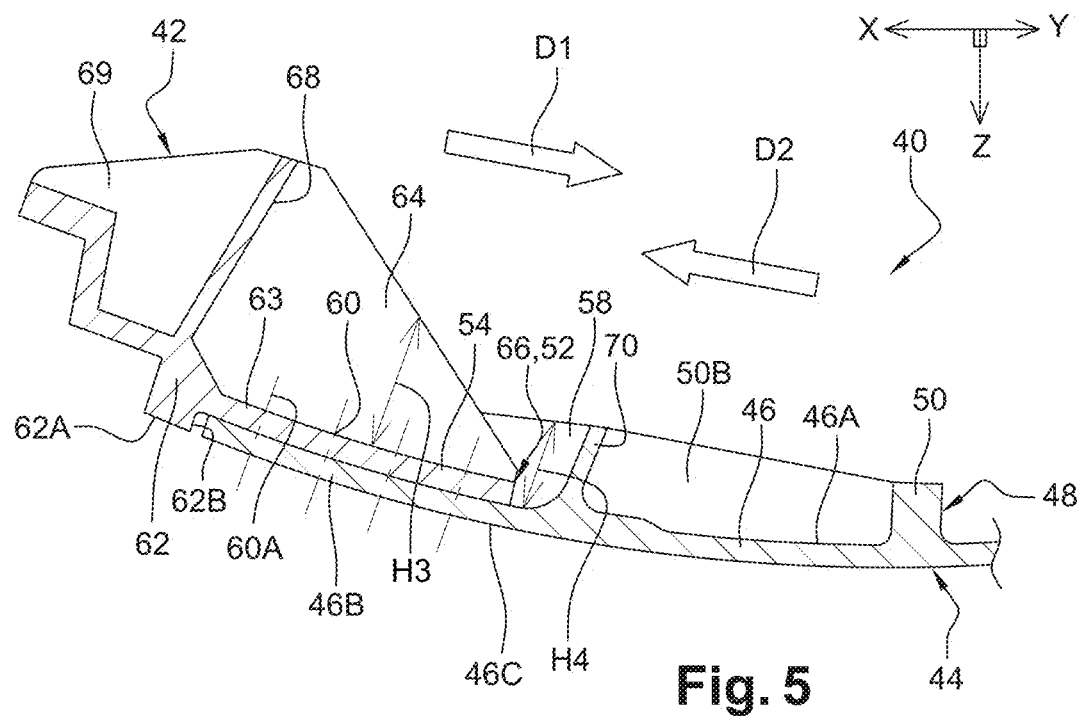

FIGS. 3-5 illustrate an aircraft assembly 40, comprising a structural element 42, in this instance a windscreen upper surround, and a self-stiffened panel 44 comprising a skin 46 and a stiffening structure 48 incorporated into the skin 46. This stiffening structure is, in general, formed of a network of ribs 50 extending out from a first face 46A of the skin, which face is intended to be positioned on the inside of an aircraft equipped with the assembly 40.

In the description which follows, the directions X, Y and Z form a direct orthonormal frame of reference and correspond respectively to the longitudinal, transverse and vertical directions of the aircraft assembly 40, these respectively corresponding to the longitudinal, transverse and vertical directions of an aircraft equipped with the assembly 40. The longitudinal direction X is oriented in a direction of travel of such an aircraft.

In the example illustrated, the panel 44 extends over the windscreen 12 and is therefore of the type sometimes referred to as a "visor."

In addition, the network of ribs 50 is of the "isogrid" type, also referred to as an "isogrid network," which means to say formed of a triangular network of ribs 36. Other configurations of network are of course possible within the context of the present invention, for example a network of the "orthogrid" type, which means to say a rectangular or square network, or even a network with changeable triangular grid cells, which means to say formed of triangles of dimensions that vary according to the region of panel considered. More generally, all possible network configurations are compatible with the present invention.

As shown by FIGS. 3 and 4, the structural element 42 has an upper rear end 52 formed of terminal tabs 54 which are separated from one another by oblong-shaped cut-outs 56.

The terminal tabs 54 are applied to the first face 46A of the skin 46 of the self-stiffened panel 44 at an end part 46B of the skin (FIG. 5).

In addition, the stiffening structure 48 of the self-stiffened panel comprises a lower front end formed of terminal ribs 58 extending respectively through the cut-outs 56.

Each cut-out 56 thus has a closed end 72, facing which a free end of the corresponding terminal rib 58 extends.

As is more clearly evident in FIGS. 4 and 5, each of the terminal tabs 54 is fixed to the end part 46B of the skin 46 of the self-stiffened panel by means of through-fixing elements 60. In the example illustrated, these fixing elements 60 pass jointly through the terminal tab 54 and the end part 46B of the skin. These fixing elements 60 are preferably rivets. As an alternative, these through-fixing elements 60 may be incorporated into the terminal tabs 54 and pass through the end part 46B of the skin 46, or vice versa.

The fixing elements 60 work mainly in shear and thus fix the self-stiffened panel 44 to the structural element 42.

In general, the alternating positioning of the terminal tabs 54 of the structural element 42 and of the terminal ribs 58 of the stiffening structure 48 allows for a progressive transfer of inertia between the self-stiffened panel 44 and the structural element 42.

The fixing elements 60 allow these two components to be held together and also make it possible to guarantee the sealing of the joint between these components.

The number of respective ends of the structural element 42 and of the stiffening structure of the self-stiffened panel 44 involved in the mode of assembly proposed by the invention may be greater than one, particularly in the case in which the structural element 42 and the self-stiffened panel 44 exhibit at least one corner on each side of which these components are assembled.

In the preferred embodiment of the invention, the terminal tabs 54 extend in the continuation of a main sole 62 of the structural element 42 (FIGS. 3 and 5) in a manner that is offset with respect to a surface 62A of the main sole 62 (FIG. 5), in this instance an external surface, which means to say, a surface intended to be positioned on the outside of the aircraft fitted with the assembly 40.

The offsetting of the terminal tabs 54 with respect to the surface 62A is such that a second face 46C of the skin 46, which is the opposite face to the first face 46A, extends, at the end part 46B of the skin, in the continuation of the surface 62A of the main sole 62 of the structural element.

In the example illustrated, the main sole 62 of the structural element 42 exhibits a step 62B (FIG. 5) and extends, from the step 62B, in the form of a fixing sole 63 which therefore extends in a manner which is offset with respect to the surface 62A. The terminal tabs 54 form extensions of the fixing sole 63 (FIGS. 3 and 5). The fixing sole 63 is applied to the first face 46A of the skin 46 of the self-stiffened panel 44 and is fixed to the end part 46B of the skin 46 by means of fixing elements 60A similar to the fixing elements 60.

Moreover, each of the terminal tabs 54 comprises a respective stiffening rib 64 (FIGS. 3-5) which extends in the direction of a free end 66 of the terminal tab, from a main rib 68 of the structural element 42. More specifically, each stiffening rib 64 extends in a respective direction D that is locally substantially orthogonal to the main rib 68 (FIG. 3), and has a height H3 (FIG. 5) which decreases in the local direction D1 extending from the main rib 68 towards the free end 66 of the terminal tab (FIG. 3).

The stiffening ribs 64 are thus intercalated between the terminal ribs 58.

In the example illustrated, the cut-outs 56 are oblong in shape in a direction that is locally orthogonal to the main rib 68. Thus, the terminal ribs 58 extend locally in a manner that is substantially orthogonal to the main rib 68.

In addition, the structural element 42 comprises secondary ribs 69 which each extend in the continuation of a corresponding stiffening rib 64 and on the other side of the main rib 68.

The collection of ribs 64, 68, 69 of the structural element 42 is preferably produced as an integral part of the main sole 62, the fixing sole 63 and the terminal tabs 54. As an alternative, these elements may be assembled with one another without departing from the scope of the present invention.

Similarly, the stiffening structure 48 of the self-stiffened panel comprises a closure rib 70 to which the terminal ribs 58 of the stiffening structure 48 are connected.

In addition, the terminal ribs 58 each have a height H4 (FIG. 5) which decreases in the local direction D2 extending from the closure rib 70 towards the closed end 72 of the corresponding cut-out 56 (FIGS. 3 and 4). The height H4 decreases preferably progressively down to zero so that the terminal ribs 58 each have a chamfered profile dying away on the first face 46A of the skin 46.

In the preferred embodiment of the invention, each terminal rib 58 is connected to the closure rib 70 at a corresponding connection region 74 (FIGS. 3 and 4) to which other ribs 50A, 50B of the stiffening structure 48, for example two of these, are connected.

In the particular case of a panel adjacent to the windscreen of an aircraft, the use of a self-stiffened panel, in particular, allows better ability to withstand bird strike or collisions with other projectiles likely to strike the nose of an aircraft.

The aircraft assembly according to the invention may, of course, relate to other types of panels and structural elements just as advantageously, for example a lower panel or "deflector" connected to a windscreen lower surround, a fuselage panel connected to a door or window surround, or even a fuselage front or rear sealed bulkhead connected to a sealed bulkhead surround.

In general, the invention therefore allows robust assembly of a self-stiffened panel with an adjacent structural element, and thus makes it possible to enjoy the full benefit of the advantages inherent to self-stiffened panels within an aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft assembly comprising:
a structural element, and
a self-stiffened panel comprising a skin and a stiffening structure incorporated into the skin and formed of a network of ribs extending out from a first face of the skin,
the structural element comprising at least one end formed of several terminal tabs separated from one another by cut-outs and applied to the first face of the skin of the self-stiffened panel at an end part of the skin, the terminal tabs delimiting the cut-outs,
the stiffening structure of the self-stiffened panel comprises at least one end formed of several terminal ribs extending respectively through the cut-outs, and
each of the terminal tabs is fixed to the end part of the skin of the self-stiffened panel by means of through-fixing elements.

2. The aircraft assembly according to claim 1, in which the terminal tabs comprise respective stiffening ribs.

3. The aircraft assembly according to claim 2, wherein the structural element comprises a main rib to which the respective stiffening ribs of the terminal tabs are connected.

4. The aircraft assembly according to claim 2, wherein each of the respective stiffening ribs of the terminal tabs has a height which decreases in the direction of a free end of the corresponding terminal tab.

5. The aircraft assembly according to claim 1, wherein each of the terminal ribs has a height which decreases in a direction of a closed end of the corresponding cut-out.

6. The aircraft assembly according to claim 1, wherein the stiffening structure of the self-stiffened panel comprises a closure rib to which the terminal ribs are connected.

7. The aircraft assembly according to claim 6, wherein each of the terminal ribs is connected to a region of connection to the closure rib of at least one other rib of the stiffening structure, which other rib is arranged on the other side of the closure rib from the terminal rib.

8. The aircraft assembly according to claim 1, wherein the fixing elements pass jointly through the terminal tabs and the end part of the skin of the self-stiffened panel.

9. The aircraft assembly according to claim 1, wherein the terminal tabs extend in the continuation of a main sole of the structural element in a manner that is offset with respect to a surface of the main sole, such that the end part of the skin has a second face, the opposite face to the first face, extending in the continuation of said surface of the main sole.

10. The aircraft assembly according to claim 1, wherein the structural element is a windscreen surround, and the self-stiffened panel forms a visor or a fuselage deflector.

11. The aircraft assembly according to claim 1, wherein the structural element is a door or window surround, and the self-stiffened panel is a fuselage panel.

12. The aircraft assembly according to claim 1, wherein the structural element is a sealed bulkhead surround, and the self-stiffened panel forms an aircraft fuselage front or rear sealed bulkhead.

* * * * *